United States Patent [19]

Süling et al.

[11] 4,233,424
[45] Nov. 11, 1980

[54] PROCESS FOR THE PRODUCTION OF BEAD POLYMERS

[75] Inventors: Carlhans Süling, Odenthal; Gerhard Ballé, Leverkusen; Michael Walkowiak, Cologne; Hans-Hermann Schulz, Leichlingen, all of Fed. Rep. of Germany

[73] Assignee: Bayer Aktiengesellschaft, Leverkusen, Fed. Rep. of Germany

[21] Appl. No.: 899,980

[22] Filed: Apr. 25, 1978

[30] Foreign Application Priority Data

Apr. 29, 1977 [DE] Fed. Rep. of Germany ....... 2719149

[51] Int. Cl.³ .............................................. C08L 75/00
[52] U.S. Cl. ................................... 525/440; 525/455; 525/920
[58] Field of Search ...................... 260/859 R, 998.11; 525/440, 455

[56] References Cited

U.S. PATENT DOCUMENTS

| | | | |
|---|---|---|---|
| 3,509,234 | 4/1970 | Burlant | 260/859 R |
| 3,641,199 | 2/1972 | Niederhauser | 260/859 R |
| 3,677,920 | 7/1972 | Kai | 260/859 R |
| 3,700,752 | 10/1972 | Hutchinson | 260/859 R |
| 3,868,431 | 2/1975 | Hutchinson | 260/859 R |
| 3,876,726 | 4/1975 | Ford | 260/859 R |
| 3,907,751 | 9/1975 | Knight | 260/859 R |
| 3,962,370 | 6/1976 | Hutchinson | 260/859 R |
| 3,968,089 | 7/1976 | Cuscurida | 260/859 R |
| 4,073,828 | 2/1978 | Ferrarini | 260/859 R |
| 4,089,763 | 5/1978 | Dart | 260/859 R |
| 4,110,184 | 8/1978 | Dart | 260/998.11 |
| 4,112,017 | 9/1978 | Howard | 260/859 R |
| 4,133,723 | 1/1979 | Howard | 260/859 R |
| 4,134,930 | 1/1979 | Kubota | 260/859 R |
| 4,134,935 | 1/1979 | Quiring | 260/998.11 |

FOREIGN PATENT DOCUMENTS 1373182  11/1974  United Kingdom ................ 260/859 R

*Primary Examiner*—Paul Lieberman
*Attorney, Agent, or Firm*—Connolly and Hutz

[57] ABSTRACT

A two-phase bead polymer having an average bead diameter of 10 to 120μ, and comprising (A) 88 to 99.5% by weight of a polymer of polymerized units of at least one methacrylic acid ester containing from 1 to 10 carbon atoms in the aliphatic, saturated alcohol component, the methacrylic ester polymer, optionally, containing up to 30% by weight of copolymerized units of at least one monomer selected from acrylic acid esters containing from 1 to 10 carbon atoms in the aliphatic saturated alcohol component, hydroxyalkyl esters of methacrylic acid containing from 2 to 4 carbon atoms in the alkyl group, styrene, vinyl acetate, (meth)acrylamide, (meth)acrylic acid and/or itaconic acid, and (B) 0.5 to 12% by weight of a polyurethane.

17 Claims, No Drawings

PROCESS FOR THE PRODUCTION OF BEAD POLYMERS

This invention relates to a process for the production of bead polymers by the radical bead polymerisation of methacrylic acid esters and, optionally, other monomers in the presence of monomer-soluble polyurethanes and a dispersant in aqueous medium.

Polymethyl methacrylate beads are used as starting materials for dental plastics. The production of dental beads such as these based on homopolymers and copolymers of methyl methacrylate by the process of bead polymerisation is known and is described, for example, in Houben-Weyl, Methoden der Organischen Chemie, Vol. XIV/1, pages 406 to 420 and pages 1053 to 1058.

Polymer beads with a defined grain size distribution are obtained by known methods. These polymer beads can be processed, for example, into injection-moulded articles or into extruded profiles. It is also possible to process these polymer beads into false teeth by the "powder/liquid process" according to German Patent No. 737,058.

Particles and objects of polymethyl methacrylates have the disadvantage of a very low impact strength. This disadvantage restricts the use of polymethyl methacrylates as starting materials for false teeth or makes it necessary to offset the disadvantage at least partly by means of complicated constructions.

It is known that the impact strength of articles or objects of polymethyl methacrylates can be improved by polymeric additives introduced during polymerisation of the monomer. Additives with more or less pronounced rubber or elastomer properties are generally used. According to German Offenlegungsschrift No. 2,161,496 for example, the toughness of polymethyl methacrylates can be improved by producing crosslinked polymers having glass temperatures of below 0° C. in the reaction medium during the bulk polymerisation of methyl methacrylate and subsequently completing the bulk polymerisation of the methyl methacrylate in moulds. Suitable crosslinked polymers are vinyl polymers containing functional groups, for example hydroxyl groups, crosslinked with polyisocyanates.

In addition, it is known from German Offenlegungsschrift No. 2,003,365 that polymers with different contents of methyl methacrylate polymers and crosslinked polyurethanes can be produced with improved toughness by producing a gel of methyl methacrylate and a crosslinked polyurethane and subsequently carrying out a bulk polymerisation reaction with this gel in a predetermined mould.

Finally, it is known that polyurethanes obtained by polyaddition from compounds containing at least two hydroxyl groups, diisocyanates and a polymerisable, ethylenically unsaturated compound containing a group reactive with isocyanate groups and methyl methacrylate and, optionally, other monomers can be bulk polymerised in moulds. The polyurethane can even be produced in methyl methacrylate as solvents. The methyl methacrylate and the other optional monomers can be incorporated into the polyurethane molecule during the polymerisation reaction. The end products are said to show improved mechanical properties, such as increased impact strength, by comparison with unmodified methyl methacrylate polymers (cf. German Offenlegungsschrifts Nos. 2,312,973 and 2,033,157).

An object of the present invention is to provide a simple, reproducible process requiring relatively simple apparatus for the production of bead polymers on polymers of methacrylic acid esters and, optionally, other monomers and polyurethanes.

According to the invention, this object is achieved in that the methacrylic acid esters and, optionally, other monomers are radically polymerised by the process of bead polymerisation in the presence of monomer-soluble polyurethanes and a dispersant in aqueous medium.

It is surprising that the process of bead polymerisation can be carried out in the presence of the abovementioned monomer-soluble polyurethanes because, for this polymerisation process to be carried out satisfactorily, the polymer and the monomers used have to form a one-phase system. In many cases, however, the polyurethanes used for elasticisation are insoluble in the polymethyl methacrylate formed. Accordingly, phase-separation occurs during the polymerisation process. In addition, it is surprising that the bead polymerisation process takes place in a controlled, undisturbed manner because the additives according to the invention increase the viscosity of the liquid beads to be polymerised with the result that the formation of fine polymer beads is complicated or could not have been expected to take place. On the contrary, it might have been expected from the increase in viscosity that the beads obtained would be large and hence suitable for use as dental beads, for example.

Accordingly, the present invention provides a process for the production of two-phase bead polymers having an average bead diameter of from 10 to 120μ of (A) 88 to 99.5% by weight of a polymer of polymerised units of at least one methacrylic acid ester containing from 1 to 10 carbon atoms in the aliphatic, saturated alcohol component, the methacrylic ester polymer optionally containing up to 30% by weight of copolymerised units of at least one monomer from the group comprising acrylic acid esters containing from 1 to 10 carbon atoms in the aliphatic, saturated alcohol component, hydroxyalkyl esters of methacrylic acid containing from 2 to 4 carbon atoms in the alkyl group, styrene, vinyl acetate, (meth)acrylamide, (meth)acrylic acid and/or itaconic acid, and (B) 0.5 to 12% by weight of a polyurethane, wherein a solution of (A$_1$) 88 to 110 parts by weight of at least one methacrylic acid ester containing from 1 to 10 carbon atoms in the aliphatic, saturated alcohol component, up to 40 parts by weight of the methacrylic acid ester optionally being replaced by at least one monomer from the group comprising acrylic acid esters containing from 1 to 10 carbon atoms in the aliphatic, saturated alcohol component, hydroxyl alkyl esters of methacrylic acid containing from 2 to 4 carbon atoms in the alkyl group, styrene, vinyl acetate, (meth)acrylamide, (meth)acrylic acid and itaconic acid, and (B$_1$) 0.5 to 12 parts by weight of a linear polyurethane having a molecular weight (number average $\overline{M}_n$) of from $10^4$ to $10^5$ is polymerised in aqueous medium, from 1 to 6 parts by weight of aqueous medium being present per part by weight of the solution of (A$_1$) and (B$_1$), under the conditions of bead polymerisation in the presence of from 0.5 to 2.5% by weight, based on the polymerisable compounds, or at least one monomer-soluble radical former, and of from 0.5 to 100% by weight, based on the polymerisable compounds, of a dispersant at temperatures of from 20° to 120° C., in the absence of applied pressure or under pressures of up to 20 bars and, optionally, in the presence of from 0.001 to 2% by weight, based on the polymerisable compounds, of an anionic emulsifier.

The present invention also provides the bead polymers obtained in accordance with the invention. The bead polymers have average bead diameters of from 10 to 120μ and preferably from 35 to 100μ. The bead polymer of the components (A) and (B) represents a two-phase system consisting of the (co)polymer phase (A) and the polyurethane phase (B). Even when the polyurethane used does not contain any polymerisable C—C—double bonds, the two phases may be chemically joined to a certain extent (corresponding to a degree of grafting of from 1 to 20%). If the polyurethane (B$_1$) used contains polymerisable C—C—double bonds emanating from the incorporation of ethylenically unsaturated, polymerisable chain terminators containing hydroxyl groups, the chemical link between the polymer phase (A) and the polyurethane phase (B) is strengthened. In either case, however, the bead polymers retain their two-phase character, even when the degree of grafting amounts to more than 90%.

Methacrylic acid alkyl esters containing from 1 to 10 carbon atoms in the alcohol component are generally used as the monomer (A$_1$). In some cases, however, it is advisable to use monomer mixtures in order to produce beads with defined swelling properties. Particularly suitable comonomers are esters of acrylic acid with (C$_1$-C$_{10}$)-alcohols, for example methyl acrylate, ethyl acrylate, butyl acrylate, decyl acrylate or methacrylic acid esters containing functional groups such as, for example, methacrylic acid-2-hydroxypropyl ester or methacrylic acid hydroxyethyl ester. In order to obtain special properties, it may be advantageous to use styrene or styrene derivatives, vinyl esters such as vinyl acetate, acrylamides or methacrylamides as comonomers. Even the addition of small quantities of acrylic acid, methacrylic acid or itaconic acid as comonomers can prove advantageous. However, methacrylic acid esters are preferably used as the monomers. Of the methacrylic acid esters, methyl methacrylate alone or as the main component of mixtures gives the best results. It is particularly preferred to use methyl methacrylate on its own as component (A$_1$).

The polyurethane elastomers used in accordance with the invention may be produced by methods known in polyurethane chemistry from one or more diol components (a), a diisocyanate (b) and, optionally, a monofunctional chain terminator (c) containing hydroxyl groups. From 1.01 to 1.3 NCO-equivalents of the diisocyanate (b) and from 0.01 to 0.3 hydroxyl equivalents of the components (c) are generally used and reacted for every hydroxyl equivalent of the components (a).

One or more relatively long chain diols having a molecular weight of from 400 to 6000 and also one or more relatively short chain diols having a molecular weight of ≦400 acting as chain extenders are normally used as the diol components. The procedures which may be adopted include the so-called one-shot process in which all the components are combined and reacted in a single stage to form the final polyurethane, and also the two-stage or prepolymer process. In the latter process, a polyurethane prepolymer containing terminal NCO-groups is initially prepared from the relatively long chain diol and the excess diisocyanate, after which the high molecular weight polyurethane is synthesised by adding the chain extender in a quantity calculated from the NCO-group content. This procedure provides firstly for better control of the distribution of the various chain units along the polyurethane chain and, secondly, provides for control of the viscosity which is a measure of the molecular weight. Once the required viscosity has been reached, the polyaddition reaction is terminated by the addition of the monofunctional chain terminator.

Suitable relatively long chain diols containing two terminal hydroxyl groups in the molecule are polyester diols, polyether diols, polyacetals, polycarbonates and polyester amides.

The polyesters containing hydroxyl groups which may be used in accordance with the invention are, for example, reaction products of dihydric alcohols with dibasic carboxylic acids. Instead of using the free polycarboxylic acids, it is also possible to use the corresponding polycarboxylic acid anhydrides or corresponding polycarboxylic acid esters of lower alcohols or their mixtures for producing the polyesters. The polycarboxylic acids may be aliphatic, cycloaliphatic, aromatic and/or heterocyclic and may optionally be substituted, for example by halogen atoms, and/or unsaturated. Examples of these polycarboxlic acids are succinic acid, adipic acid, suberic acid, azelaic acid, sebacic acid, phthalic acid, isophthalic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric fatty acids, such as oleic acid, terephthalic acid dimethyl ester and terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethylcyclohexane), 2-methyl-1,3-propane diol, and also diethylene glycol, triethylene glycol, tetraethylene glycol, polyethylene glycols, dipropylene glycol, polypropylene glycols, dibutylene glycol and polybutylene glycols. Polyesters of lactones, for example, ε-caprolactone, or hydroxy carboxylic acids, for example ω-hydroxy caproic acid, may also be used.

The polyethers containing two hydroxyl groups which may be used in accordance with the invention are also known per se and are obtained, for example, by the polymerisation of epoxides, such as ethylene oxide, propylene oxide, butylene oxide, tetrahydrofuran, styrene oxide or epichlorohydrin on their own, for example in the presence of BF$_3$, or by the addition of these epoxides, optionally in admixture or successively, with starter components containing reactive hydrogen atoms, such as alcohols or amines, for example water, ethylene glycol, 1,3- or 1,2-propylene glycol, 4,4'-dihydroxy diphenyl propane or aniline. Polyethers predominantly containing primary OH-groups (up to 90% by weight, based on all the OH-groups present in the polyether), are particularly preferred.

Suitable polyacetals are, for example, the compounds obtainable from glycols, such as diethylene glycol, triethylene glycol, 4,4'-dioxethoxy diphenyl dimethyl methane, hexane diol and formaldehyde. Polyacetals suitable for the purposes of the invention can also be produced by the polymerisation of cyclic acetals.

Polycarbonates containing hydroxyl groups which may be used in accordance with the invention are those known per se which may be obtained, for example, by reacting diols, such as 1,3-propane diol, 1,4-butane diol and/or 1,6-hexane diol, diethylene glycol, triethylene glycol or tetraethylene glycol, with diaryl carbonates, for example diphenyl carbonate, or phosgene.

Representatives of these compounds which may be used in accordance with the invention are described, for example, in High Polymers, Vol. XVI, "Polyurethanes, Chemistry and Technology" by Saunders-Frisch, Interscience Publishers, New York, London, Vol. I. 1962, pages 32–42 and pages 44–54 and Vol. II, 1964, pages 5–6 and 198–199, and in Kunststoff-Handbuch, Vol. VII, Vieweg-Hoechtlen, Carl-Hanser-Verlag, Munich, 1966, for example on pages 45 to 71. The following are examples of short-chain compounds containing two hydroxyl groups which may be used as chain extenders in accordance with the invention: ethylene glycol, 1,2- and 1,3-propylene glycol, 1,4- 1,3- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, diethylene glycol, triethylene glycol, tetraethylene glycol, polyethylene glycols having a molecular weight of $\leq 400$, dipropylene glycol, polypropylene glycols having a molecular weight of $\leq 400$, dibutylene glycol, polybutylene glycols having a molecular weight of $\leq 400$, 4,4'-dihydroxy diphenyl propane or hydroquinone-bis-(2-hydroxyethylether).

The choice of the suitable diisocyanate (component B) is limited by the need for high light stability and resistance to yellowing because this requirement is only satisfied by the aliphatic diisocyanates. Diisocyanates such as these are derived from a linear or branched hydrocarbon skeleton having from 2 to 36 carbon atoms and also from cycloaliphatic or araliphatic hydrocarbon skeletons. The following are examples of diisocyanates which are suitable for the purposes of the invention: ethylene diisocyanate, 1,4-tetramethylene diisocyanate, 1,6-hexamethylene diisocyanate, 1,12-dodecane diisocyanate, dissocyantes based on dimerised fatty acids which are obtained by converting dicarboxylic acids of this type into the corresponding diamines, followed by phosgenation, 2,2,4- or 2,4,4-trimethyl hexamethylene diisocyanate, and also diisocyanates containing ester groups of the type mentioned in German Offenlegungsschrift No. 2,033,157 and defined therein by formulae IV to XIII, ester diisocyanates derived from esters of α,ω-diaminocarboxylic acids, such as for example lysine methyl ester-α,ω-diisocyanate, cyclobutane-1,3-diisocyanate, 1,3- and 1,4-diisocyanatocyclohexane, 2,4- and 2,6-diisocyanatomethyl cyclohexane or 2,2'-,2,4'- or 4,4'-diisocyanatodicyclohexyl methane, in each case in the form of the pure stereoisomers or geometric isomers or mixtures of these isomers, 3-isocyanatomethyl-3,5,5-trimethyl cyclohexyl isocyanate (isophorone diisocyanate) and also xylylene diisocyanates. Other suitable diisocyanate components are preadducts containing urethane groups and two terminal NCO-groups, prepared from a diol and an excess of one of the above mentioned diisocyanates.

Patricularly preferred diisocyanates are hexamethylene diisocyanate, 2,24- and 2,4,4-trimethyl hexamethylene diisocyanate or their mixtures, 4,4'-diisocyanato-cyclohexyl methane or isophorone diisocyanate, particularly isophorone diisocyanate.

In order to avoid an excessive increase in viscosity during production of the polyurethane, the hydroxyl component and isocyanate component are not used in an equimolar ratio. Instead, an excess of one or the other component is used. In the prepolymer process in particular, an NCO-functional polyurethane prepolymer which is free from OH-groups but which may still contain free diisocyanate is obtained in a first stage and, in a second stage, is reacted with the chain extender until the required molecular weight is obtained. The product is normally left with a residue of free NCO-groups which are best capped by means of a monofunctional chain terminator [component (C)]. Suitable chain terminators are, for example, lower aliphatic alcohols such as methanol, ethanol or butanol. In addition, polymerisable groups may be introduced simultaneously with termination of the chain, for which purpose ahydroxyl-functional compound containing an ethylenically unsaturated double bond, for example allyl alcohol or hydroxyalkyl esters of α,β-monoolefinically unsaturated carboxylic acids containing from 3 to 5 carbon atoms and from 2 to 4 carbon atoms in the alkyl group, such as 2-hydroxyethyl methacrylate, 2-hydroxypropyl methacrylate, 2-hydroxybutyl methacrylate, 4-hydroxylbutyl methacrylate or the corresponding acrylic acid esters, are used.

The polyurethane elastomer is best prepared in the form of a solution in monomeric methyl methacrylate or in the mixture of monomers which are subjected to the bead polymerisation reaction. This solution may be directly used for the bead polymerisation reaction, optionally after dilution with more monomer. In this connection, it is possible on the one hand to carry out the synthesis process either completely or partly in solution, and on the other hand the polyaddition reaction may even be carried out in the absence of solvents, and the product taken up in the monomer. The second of these two possible procedures has the advantage of a higher reaction velocity, particularly since, when working in solution, there is an upper limit to the reaction temperature on account of the tendency towards polymerisation of the methacrylate used as solvent. The velocity of the polyaddition reaction can be increased by the addition of standard catalysts. Catalysts such as these are, for example, tertiary amines such as tributylamine, dimethyl benzylamine, dimethyl cyclohexylamine or 1,4-diazabicyclo-[2.2.2]-octane or organic compounds of divalent or tetravalent tin, such as tin dioctoate or dibutyl tin dilaurate. These catalysts may be used in quantities of from 0.001 to 10% by weight, based on the polyol components.

Accordingly, the process for producing the polyurethane is carried out by dissolving the relatively long chain diol, the chain extender and the diisocyanate in methyl methacrylate, the concentrations of the starting materials not being too low in the interests of as high a reaction velocity as possible, adding one of the above-mentioned catalysts and allowing the mixture to react at elevated temperature until the NCO-group content has reached a predetermined value. The generally relatively highly viscous solution is then diluted with more methacrylate, followed by addition of the chain terminator in a quantity calculated from the NCO-content or in a slight excess. Another possible method of carrying out the process is initially to react the isocyanate and the relatively long chain diol to form an NCO-prepolymer and then to chain extend the NCO-prepolymer thus formed with the short-chain diol. Production of the prepolymer is best carried out in the absence of solvents and, even in the absence of catalysts, takes place at a sufficiently high velocity at temperatures of from 80° to 100° C. Depending upon the NCO-/OH-equivalent ratio selected, a value to be calculated in advance for the final content of NCO-groups is reached, the reaction usually stopping at this point.

The necessary quantity of chain extender can be calculated from this NCO-group content in accordance with the following equation:

$$g \text{ of chain extender} = \frac{NCO\text{-number} \times \text{weight of the prepolymer}}{100 \times 84} \times \begin{array}{l}\text{molecular} \\ \text{weight of the} \\ \text{chain extender}\end{array}$$

A so-called degree of extension is defined, indicating the percentage quantity, equivalent to the NCO-content, in which the chain extender is used. This degree of extension which is applied in practice is selected in such a way that the viscosity of a 20% by weight solution of the elastomer in methyl methacrylate assumes a value of no higher than 2000 cP. Chain extension may also be carried out in the melt, although it is also possible, in order to keep the accompanying increase in viscosity within limits, to add part of the methyl methacrylate required as solvent. After the required final viscosity or rather the preselected degree of extension has been reached, the reaction is stopped. This is done by reacting the residual NCO-groups with the monofunctional chain terminator, the necesary quantity of which may be calculated in accordance with the following equation:

$$g \text{ of chain terminator} = \frac{NCO\text{-number of the prepol.} \times \text{weight of the prepol.}}{100 \times 84} \times \frac{100\text{-degree of extension}}{100} \times \begin{array}{l}\text{molecular weight of the chain} \\ \text{terminator}\end{array}$$

Unless the prepolymerisation reaction has already been catalysed, a small quantity, for example from 0.005 to 0.5% by weight, based on the total solids content, of one of the above mentioned catalysts may be added in order to accelerate termination of the reaction. The final elastomer solution may be stored under the usual precautionary measures, such as cooling and the absence of air.

The polyurethanes used for the process according to the invention are linear in structure, i.e. are uncrosslinked and monomer-soluble. The viscosities of a 20% by weight solution of the polyurethanes in methyl methacrylate amount to between 50 and 2000 cP, as measured at 25° C. in a rotary viscosimeter. The molecular weights of the polyurethanes (number average $\overline{M}_n$, as determined by membrane osmometry) amount to between about $10^4$ and $10^5$.

The choice of a suitable dispersant or dispersant system is important to the production of the bead polymers by the process according to the invention. Suitable dispersants are finely divided inorganic compounds which are insoluble in the polymerisation medium and which may optionally be produced by a reaction in the polymerisation medium. Particularly suitable dispersants are insoluble salts of the alkaline earth metals such as, for example, alkaline earth sulphates, alkaline earth phosphates or alkaline earth carbonates. Magnesium carbonate is particularly suitable.

Other suitable dispersants are polymethacrylic acids or copolymers, for example of methacrylic acid with methacrylic acid methyl ester, or polyvinyl alcohols or partially hydrolysed polyvinylacetates. Derivatives of cellulose such as, for example, methyl cellulose are also suitable dispersants.

The dispersants are generally used in quantities of from 0.5 to 100% by weight and preferably in quantities of from 1 to 50% by weight, based on the polymerisable compounds.

It can be advantageous to carry out the bead polymerisation reaction in the presence of small quantities of an emulsifier. Particularly suitable emulsifiers are anionic emulsifiers, such as the alkali metal salts of long-chain aliphatic sulphonic acids containing from 6 to 30 carbon atoms or the alkali metal salts of sulphates of long-chain alcohols containing from 6 to 30 carbon atoms. Sodium stearate or potassium oleate are also useful additives. The alkali metal salts of sulphosuccinic acid semiesters have proved to be extremely suitable.

The emulsifiers may be used in quantities of from 0.001 to 2% by weight and preferably in quantities of from 0.05 to 1% by weight, based on the polymerisable compounds.

Suitable polymerisation initiators are radical formers, i.e. compounds or mixtures of compounds which decompose into radicals and which are able to initiate a polymerisation reaction. The radical formers must be soluble in the monomers, although this does not prevent them from being additionally soluble in the aqueous polymerisation medium as well. Particularly suitable polymerisation initiators are peroxidic compounds or aliphatic azo compounds. Radical formation may be obtained advantageously at even relatively low reaction temperatures by using known redox activators. In most cases, however, it has proved to be favourable to carry out the polymerisation reaction with diacyl peroxides which show high monomer solubility. Suitable diacyl peroxides are benzoyl peroxide, chlorobenzoyl peroxide and lauroyl peroxide. In addition, percarbonates, such as for example dicyclohexyl percarbonate or alkyl acyl peroxides, such as tert.-butyl perpivalate, are suitable initiators for the bead polymerisation reaction according to the invention.

In many cases, the use of mixtures of diacyl peroxides and alkylacyl peroxides is particularly advantageous in case where it is intended to form starter radicals at relatively low temperatures. The radical formers or their mixtures are generally used in quantities of from 0.5 to 2.5% by wt. and preferably in quantities of from 0.7 to 1.5% by weight, based on the polymerisable compounds. In the context of the invention, polymerisable compounds are polymerisable compounds containing C-C-double bonds.

The polymerisation temperature is dependent upon the boiling point of the monomer or monomer mixture used and is in the range of from 20° to 120° C., depending upon the decomposition temperature of the peroxidic initiator used. The polymerisation reaction is preferably carried out at temperatures of from 50° to 90° C., particularly good results being obtained at temperatures in the range of from 60° to 85° C.

In the context of the invention, the process of bead polymerisation of monomers is understood to be the polymerisation of these monomers in a stirred or "turbined" aqueous medium. Relatively fine or relatively coarse beads with a narrow or wide grain size distribution are obtained, depending upon the stirring speed to be adjusted and upon the construction of the stirrer.

In the context of the invention, the aqueous medium used is understood to be water which contains the polymerisation auxiliaries in solution, dispersion or emulsion. These auxiliaries are essentially the above-described dispersants, emulsifiers and also buffer substances and, proportionately, even radical formers.

Effective stirrer systems are normally used for dispersing the monomers. High-speed anchor or paddle stirrers which generate a high degree of turbulence in the reaction medium and maintain it throughout the polymerisation reaction are particularly effective. The polymerisation reaction may be carried out in the absence of applied pressure or under excess pressure. Particularly good results are obtained when the polymerisation reaction is carried out under elevated nitrogen pressures of up to 20 bars, preferably up to 8 bars.

The monomers are polymerised up to as high a conversion as possible. In general, the monomer conversion amounts to between 85 and 95%.

The two-phase bead polymers according to the invention may be processed for the production of injection-moulded articles or extruded profiles. However, they are primarily used as dental beads for dental applications, particularly by the "powder/liquid process," for example, according to German Patent No. 738,058.

The parts and percentages quoted in the following Examples relate to weight, unless otherwise stated.

Starting materials:
Production of the polyurethane solutions used;
Solvent methyl methacrylate
Polyurethane solution I:

In a dry stirrer-equipped vessel, which is provided with a metering unit and a reflux condenser and which is sealed off against the penetration of atmospheric moisture, 270.5 g (2.438 equivalents) of 3-isocyanato-3,5,5-trimethyl cyclohexyl isocyanate (isophorone diisocyanate) are heated to 50° C. together with 0.6 g of tin dioctoate. 850 g (1 equivalent) of a linear polyester diol of adipic acid, 1,6-hexane diol and neopentyl glycol having a hydroxyl number of 66 are dehydrated in vacuo for 30 minutes at 110° C. and dissolved together with 58.5 g (1.3 equivalents) of 1,4-butane diol in 265 g of methyl methacrylate. This solution is added dropwise over a period of 4 hours to the heated diisocyanate, after which stirring is continued until the NCO-content has fallen to 0.5% (calculated 0.4%). 19.5 g (0.15 equivalent) of β-hydroxyethyl methacrylate and another 0.6 g of tin dioctoate are then added. The mixture is diluted with 700 g of methyl methacrylate and stirred for another 5 hours at 50° C. The resulting polyurethane solution has a solids content of 55% and a viscosity of 480 cP, as measured at 22° C. with a Haake-Viskotester, spindle No. 2.

Polyurethane solutions II to V:

Mixtures of the polyester diol (polyester A) used for preparing solution I and another linear polyester diol of adipic acid anhydride, phthalic acid anhydride and ethylene glycol having a hydroxyl number of 64 (polyester B) are reacted without preliminary dehydration with different quantities of isophorone diisocyanate at 80° C. until the calculated NCO-content has been reached to form polyurethane prepolymers. The polyurethane prepolymers thus formed are subjected in the melt to chain extension with the quantities of 1,4-butane diol specified in the following Table up to the particular resulting degree of extension, the degree of extension being defined as the percentage of extender, based on its stoichiometrically calculated quantity. The highly viscous melt is then taken up in monomeric methyl methacrylate and the solids content is adjusted to 40 %. The residual isocyanate content of the polyurethane is capped by the action of 2-hydroxyethyl methacrylate in the presence of tin dioctoate. The solution are colourless and completely free from clouding and gels.

| Polyurethane solution | II | III | IV | V |
|---|---|---|---|---|
| Polyester A (g) | 297 | 297 | 297 | 297 |
| equivalents | 0.35 | 0.35 | 0.35 | 0.35 |
| Polyester B (g) | 131 | 131 | 131 | 131 |
| equivalents | 0.15 | 0.15 | 0.15 | 0.15 |
| Isophorone diisocyanate (g) | 83.3 | 111 | 138.8 | 166.5 |
| equivalents | 0.75 | 1.0 | 1.25 | 1.5 |
| NCO/OH-index | 150 | 200 | 250 | 300 |
| NCO-content of the prepolymer (%) | 2.06 | 2.1 | 4.95 | 6.3 |
| 1,4-butane diol (g) | 9.7 | 10.15 | 26.9 | 36.0 |
| Degree of extension (%) | 85 | 90 | 90 | 90 |
| Methyl methacrylate (g) | 780 | 800 | 850 | 945 |
| 2-Hydroxyethyl methacrylate (g) | 2.5 | 3.1 | 3.7 | 3.9 |
| Tin dioctoate (g) | 0.2 | 0.2 | 0.2 | 0.2 |
| Solids content (%) | 40 | 40 | 40 | 40 |
| Viscosity | 120 cP | 140 cP | 165 cP | 43 cP |
| Molecular weight of the solid polyurethane, determined by gel chromatography | 21200 | 24000 | 29400 | 18400 |

EXAMPLE 1

2500 parts of deionised water and 190 parts of MgCO₃ are introduced in the absence of oxygen into a polymerisation vessel equipped with a turbine mixer. The MgCO₃ is stirred at room temperature. A solution of 67.5 parts of polyurethane II in 682.25 parts of methacrylic acid methyl ester is then introduced into the reaction vessel together with 2.5 parts of lauroyl peroxide and 2.5 parts of cyclohexyl percarbonate. A nitrogen pressure of 3 bars is adjusted and the temperature is increased to 78° C. at a stirrer speed of 500 rpm. At the beginning of the polymerisation reaction, provision is made, in the form of effective cooling, to ensure that a reaction temperature of 80° C. is maintained.

The reactor is kept for 3 hours at 78° to 80° C. and then cooled to room temperature.

The pH-value is adjusted to 1 to 2 by the addition of 260 parts of sulphuric acid. After the evolution of $CO_2$ has stopped, the polymer beads are filtered off.

After drying in vacuo at 50° C., a bead polymer containing 10% of polyurethane and 90% of polymerised methacrylic acid ester units is obtained in a yield of 88%.

According to screen analysis, the grain size distribution of the bead polymer is as follows:
<100μ 80.5%
<80μ 41.8%
<63μ 25.8%
<40μ 7.1%
<32μ 4.0%

Similar results are obtained with polyurethane I.

EXAMPLE 2

The procedure is as described in Example 1, except that a mixture of 95% of methyl methacrylate and 6 parts of polyurethane II is used instead of a mixture of 91% of methyl methacrylate and 9% of polyurethane II. A bead polymer is obtained in a yield of 89% and, according to screen analysis, shows the following grain size distribution:

<100μ 45.8%
<80μ 29.9%
<63μ 13.1%
<40μ 3.5%
<32μ 2.1%

The bead polymer contains 10% of polyurethane and 90% of polymerised methacrylic acid units.

EXAMPLE 3

A polyurethane solution VI is prepared in the same way as polyurethane solution IV except that, instead of 2-hydroxyethyl acrylate, an equivalent quantity of methanol is used for termination.

A bead polymer is then prepared as follows:

1000 parts by weight of deionised water, 0.02 part by weight of sulphosuccinic acid dioctyl ester in the form of its sodium salt, 6 parts by weight of polyvinyl alcohol (obtained by hydrolysis from a polyvinyl acetate having a molecular weight of around 75,000) and 6 parts by weight of polymethacrylic acid in the form of its sodium salt (a 1% aqueous solution of the free acid has a specific viscosity of ~4 at 25° C.) are introduced into a polymerisation vessel equipped with a stirrer and a quick-response cooling system.

The air present in the reaction vessel is displaced and the reaction medium is stirred with a paddle stirrer until all the additives have passed clearly into solution. A mixture of 292 parts by weight of methacrylic acid methylester and 18 parts by weight of polyurethane VI, which contains 1 part by weight of lauroyl peroxide and 1 part by weight of dicyclohexyl percarbonate, is then poured over the aqueous phase in the reaction vessel.

The stirrer is initially switched on at a low speed, its speed then being increased to 700 rpm over a period of 10 minutes. After 20 minutes, the mixture is heated to the reaction temperature of 80° C. which is maintained by neutralising the heat shock occurring at the beginning of polymerisation by intensive cooling.

After filtration, washing and drying, the bead polymer is isolated in a yield of 280 parts by weight; polyurethane content 6.4%.

According to screen analysis, the bead polymer has the following grain size distribution:

>315μ 0%
>200μ 3%
>100μ 21%
>40μ 67%
>40μ 12%

EXAMPLE 4

The procedure is as described in Example 3, except that the reaction is carried out in a pressure vessel using a so-called "fir-tree stirrer."

0.05 part by weight of sulphosuccinic acid dioctyl ester in the form of its sodium salt, 15 parts by weight of polyvinyl alcohol (corresponding to Example 3) and 15 parts by weight of polymethacrylic acid (corresponding to Example 3) are dissolved in 2500 parts by weight of deionised water.

A mixture of 727.5 parts by weight of methacrylic acid methyl ester, 22.50 parts by weight of polyurethane VI and 2.5 parts by weight of dicyclohexyl percarbonate is prepared and introduced into the reaction vessel with the stirrer switched off. The stirrer is then switched on at a speed of 500 rpm after the air has been displaced by nitrogen, and a nitrogen pressure of 3 atmosphere gauge is adjusted after 30 minutes. The reaction mixture is then heated to 80° C. and the heat shock occurring at the beginning of polymerisation is neutralised by intensive cooling. After 3 hours, the reaction mixture is cooled to room temperature. The polymer beads are freed from the dispersant adhering to them by washing with water. After drying, the bead polymer is isolated in a yield of 650 parts by weight; polyurethane content: 3.46%.

According to screen analysis, the bead polymer has the following grain size distribution:

<200μ 1%
<100μ 56%
<40μ 42%
<40μ 1%

EXAMPLE 5 (Use)

100 parts by weight of the bead polymer according to Example 1 are mixed with 0.25 part by weight of benzoyl peroxide in such a way that the benzoyl peroxide is uniformly distributed throughout the mixture.

30 parts by weight of this mixture are made into a paste with 18 parts by weight of a liquid of which 95 parts by weight consist of methyl methacrylate and 7 parts by weight of ethylene glycol dimethacrylate.

After adequate swelling, the paste is hardened in a gypsum mould which is in the form of a denture and in which the false teeth are fixed. The mould is heated in a water bath to 70° C. and the water bath is left at 70° C. for 30 minutes. Thereafter it is further heated to a temperature of 100° C. and kept at that temperature for 30 minutes. The gypsum mould is then cooled, emptied and the resulting moulding finished off.

A denture is obtained which reproduces the individual jaw position and replaces the missing teeth by false teeth of porcelain or polymethyl methacrylate.

Compared with a denture based on the usual polymethyl methacrylates, the denture of the dental beads according to the invention has the advantage of less brittleness and greater chewing strength when, for example, unexpected hard objects in food have to be reduced to size.

EXAMPLE 6

2500 parts of deionised water, 0.05 part by weight of sodium lauryl sulphate and 200 parts by weight of freshly precipitated $MgCO_3$ are introduced into a polymerisation vessel equipped with a high-speed anchor stirrer. 67.5 parts by weight of polyurethane IV dissolved in 682.5 parts by weight of a mixture of 90% of methyl methacrylate and 10% of ethyl acrylate are then introduced into the reaction vessel. A nitrogen pressure of 7 bars is adjusted and the speed of the stirrer is increased to 700 rpm over a period of 30 minutes. The reaction mixture is then heated to 75° C. and provision is made, in the form of effective cooling, to ensure that a temperature of 80° C. is not exceeded. The reactor is kept for 2 hours at 80° C. and then for 1 hour at 90° C. After cooling, the pH-value is adjusted to 2 by the addition of 50% sulphuric acid; after the evolution of $CO_2$ has stopped, the polymer beads are filtered off.

Yield of beads: 730 parts by weight; polyurethane content: 9.25%.

According to screen analysis, the beads have the following grain size distribution:

<100μ 85.0%
<80μ 53.5%
<63μ 30.0%
<40μ 10.8%
<32μ 4.0%

EXAMPLE 7

6000 parts by weight of deionised water, 6 parts by weight of secondary sodium phosphate and 10 parts by weight of polyvinyl pyrrolidone having a K-value of 90 are introduced into a polymerisation vessel provided with a double anchor stirrer. The aqueous phase is covered with a mixture of 2100 parts by weight of methyl methacrylate and 120 parts by weight of polyurethane III to which 20 parts by weight of benzoyl peroxide have been added beforehand.

The speed of the stirrer is increased to 450 rpm over a period of 1 hour, followed by heating to 80° C. When the polymerisation reaction begins, provision is made in the form of effective cooling to ensure that the heat of reaction is dissipated and that the temperature in the reaction vessel does not exceed 90° C. After 6 hours, the reaction mixture is cooled and, after washing and filtration, polymer beads are obtained in a yield of 95% of the theoretical amount; polyurethane content: 5.6%.

According to screen analysis, the grain size distribution of the polymer beads is as follows:

<100μ 75.5%
<80μ 43.0%
<63μ 30.0%
<40μ 6.0%

EXAMPLE 8

1000 parts by weight of deionised water, 0.01 part by weight of sulphosuccinic acid dioctyl ester in the form of its sodium salt, 2 g of polyvinyl pyrrolidone having a K-value of 90 and 3 parts by weight of secondary sodium phosphate are introduced into a polymerisation vessel which is equipped with a paddle stirrer and an effective cooling system. The air present in the polymerisation vessel is displaced by purging with nitrogen. The aqueous phase is then covered in the absence of oxygen with a mixture of 295 parts by weight of methyl methacrylate, 20 parts by weight of styrene, 19 parts by weight of polyurethane V and 2 parts by weight of azodiisobutyronitrile. The stirrer is then switched on and its speed is increased to 500 rpm over a period of 1 hour. The reactor is then heated to 85° C. and the heat shock caused by the speed of the polymerisation reaction is neutralised. After 7 hours at 85° C., the bead polymer is isolated after cooling by filtration.

Yield after washing and drying: 274 parts by weight of polymer beads; polyurethane content: 6.95%. Screen analysis:

<315μ 0%
<200μ 8%
<100μ 42%
<40μ 37%
<40μ 13%

EXAMPLE 9

2500 parts by weight of deionised water, 5 parts by weight of sulphosuccinic acid dioctyl ester in the form of its sodium salt and 190 parts by weight of MgCO₃ are introduced into a polymerisation vessel and stirred for 30 minutes at 30 rpm after the air present in the reactor has been displaced by nitrogen.

The aqueous phase is covered with a mixture of 705 parts by weight of methacrylic acid methyl ester and 45 parts by weight of polyurethane II. 2.5 parts by weight of lauroyl peroxide and 2.5 parts by weight of dicyclohexyl percarbonate are dissolved in this mixture.

The nitrogen pressure in the reactor is increased to 2 atmospheres gauge and the stirrer speed is adjusted to 300 rpm. After stirring for 30 minutes, the nitrogen pressure is adjusted to 3 atmospheres gauge and the temperature is maintained for 3 hours.

The pH-value is then adjusted to 2 by the addition of semiconcentrated sulphuric acid. The polymer beads are filtered off and washed with deionised water until no more sulphuric acid can be detected in the washing water flowing off.

670 parts by weight of polymer beads having an analytically determined nitrogen content of 0.335% and a methoxyl content of 29.0% are obtained. Polyurethane content: 6.9%.

Screen analysis:
<125μ 100%
<100μ 84.66%
<80μ 56.86%
<63μ 29.74%
<40μ 7.36%
<32μ 4.36%, LZ (=average grain size)=76.5

EXAMPLE 10

The procedure is as described in Example 9, except that polyurethane III is used as the polyurethane. 695 parts by weight of polymer beads are isolated; polyurethane content: 6.5%.

The polymer beads are found by analysis to have an N-content of 0.155% of a methoxyl content of 29.6%. Screen analysis:
<125μ 100%
<100μ 86.42%
<80μ 55.66%
<63μ 26.74%
<40μ 6.42%
<32μ 3.33% LZ=77

EXAMPLE 11

The procedure is as described in Example 2, except that polyurethane IV is used as the polyurethane. 630 parts of polymer beads are isolated; polyurethane content: 7.1%.

The polymer beads are found by analysis to have an N-content of 0.185% and a methoxyl content of 29.6%.
Screen analysis:
<125μ 100%
<100μ 86.16%
<80μ 54.9%
<63μ 22.74%
<40μ 3.58%
<32μ 1.68% LZ=77

EXAMPLE 12

The procedure is as described in Example 9, except that polyurethane V is used as the polyurethane. 665 parts by weight of polymer beads are isolated; polyurethane content 6.8%.

The polymer beads are found by analysis to have a nitrogen content of 0.15% and a methoxy content of 30.25%.

Screen analysis:
<125μ 100%
<100μ 96.3%

```
<80μ 73.2%
<63μ 30.42%
<40μ 7.74%
<32μ 3.76%, LZ=71
```

EXAMPLE 13

The procedure is as described in Example 9, except that a mixture of 67.5 parts by weight of polyurethane II and 682.5 parts by weight of methacrylic acid methyl ester is used. 660 parts by weight of polymer beads are isolated; polyurethane content: 10.4%.

Screen analysis:
```
<125μ 100%
<100μ 80.54%
<80μ 41.8%
<63μ 25.8%
<40μ 7.14%
<32μ 4.06%, LZ=84
```

EXAMPLE 14

The procedure is as described in Example 13, except that polyurethane III is used instead of polyurethane II. 690 parts by weight of polymer beads are isolated; polyurethane content: 9.8%.

Analysis reveals a nitrogen content of 0.32%.
Screen analysis:
```
<125μ 100%
<100μ 45%
<80μ 29.9%
<63μ 13.14%
<40μ 3.58%
<32μ 2.16%, LZ=101
```

EXAMPLE 15

The procedure is as described in Example 13, except that polyurethane IV is used instead of polyurethane II. 655 parts by weight of polymer beads are isolated; polyurethane content 10.6%.

The elemental analysis values are as follows:
C 60.5%
H 8.2%
N 0.32%
Screen analysis:
```
<125μ 100%
<100μ 89.34%
<80μ 55.22%
63μ 36.7%
<40μ 5.76%
<32μ 3.10%
```

EXAMPLE 16

The procedure is as described in Example 13, except that polyurethane V is used instead of polyurethane IV. 650 parts by weight of polymer beads are isolated; polyurethane content: 10.4%.

The elemental analysis values are as follows:
C 59.75%
H 8.05%
N 0.24%
Screen analysis:
```
125μ 100%
100μ 88.44%
80μ 72.64%
63μ 40.34%
40μ 10.9%
32μ 6.12%
```

COMPARISON

Mouldings are produced by producing 2 mm thick plates from 15 parts by weight of dental beads to which 0.25 part by weight of benzoyl peroxide has been added and which were then made into a paste with 5.36 parts by weight of a liquid consisting of 94 parts by weight of methyl methacrylate and 6 parts by weight of ethylene glycol dimethacrylate, and subsequently hardening the plates thus formed by polymerisation in a mould at 70° C. to 100° C. Test specimens are cut out from the plates and subjected to a DIN-bar test in accordance with DIN 53452.

|  | a | b | c | d |
|---|---|---|---|---|
| Impact strength kp/cm$^2$ | 19.4 | 30.4 | 32.0 | 49.1 |
| Bending angle ° | 18° | 12.6° | 23.4° | 16.6° |
| Flexural strength kp/cm$^2$ | 1059 | 981 | 1315 | 1086 | a Control test: Standard commercial-grade dental beads based on polymethyl methacrylate
b Example 1
c Example 14
d Example 15

We claim:
1. A two-phase bead polymer having an average bead diameter of 10 to 120μ and comprising:
   (A) 88 to 99.5% by weight of a polymer of polymerized units of at least one methacrylic acid ester containing from 1 to 10 carbon atoms in the aliphatic, saturated alcohol component, the methacrylic ester polymer optionally containing up to 30% by weight of copolymerized units of at least one monomer selected from acrylic acid esters containing from 1 to 10 carbon atoms in the aliphatic saturated alcohol component, hydroxyalkyl esters of methacrylic acid containing from 2 to 4 carbon atoms in the alkyl group, styrene, vinyl acetate, (meth)acrylamide, (meth)acrylic acid and/or itaconic acid, and
   (B) 0.5 to 12% by weight of a linear polyurethane produced by polyaddition of
      (a) one or more substantially linear bifunctional hydroxyl compounds having a molecular weight of from 400 to 6000 and a glass transition temperature of ≦ −20° C. and selected from polyesters, polyethers, polyacetals, polycarbonates, polyester amides and polyamides,
      (b) one or more aliphatic or cycloaliphatic diisocyanates,
      (c) one or more bifunctional hydroxyl compounds having a molecular weight of ≦400, and
      (d) a saturated or olefinically unsaturated compound monofunctionally reactive to isocyanates.
2. A two-phase bead polymer as claimed in claim 1, wherein component (a) is a polyester or polyether diol.
3. A two-phase bead polymer as claimed in claim 1, wherein component (b) is a diisocyanate selected from hexamethylene diisocyanate, 2,2,4- and 2,4,4-trimethyl hexamethylene diisocyanate or mixtures thereof, diisocyanatocyclohexane, methyl diisocyanatocyclohexane, diisocyanatodicyclohexyl methane or 3-isocyanatomethyl-3,5,5-trimethyl cyclohexyl isocyanate.
4. A two-phase bead polymer as claimed in claim 1 wherein component (c) is a linear or branched aliphatic diol containing from 2 to 8 carbon atoms in the mole- cule or a lower oligomer thereof having a molecular weight of $\leq 400$.

5. A two-phase bead polymer as claimed in claim 1, wherein component (d) is a compound containing at least one hydroxyl group which is free from olefinically unsaturated polymerisable groups.

6. A two-phase bead polymer as claimed in claim 5, wherein component (d) is a lower, aliphatic saturated alcohol containing from 1 to 4 carbon atoms.

7. A two-phase bead polymer as claimed in claim 1 wherein component (d) is allyl alcohol or at least one hydroxyalkyl ester, containing from 2 to 4 carbon atoms in the alkyl group, of an $\alpha,\beta$-monoolefinically unsaturated carboxylic acid containing from 3 to 5 carbon atoms.

8. A two-phase bead polymer as claimed in claim 7, wherein component (d) is at least one hydroxyalkyl ester of methacrylic acid containing from 2 to 4 carbon atoms in the alkyl group.

9. A two-phase bead polymer as claimed in claim 1, wherein the polyurethane is synthesised from:
(a) a polyester diol,
(b) hexamethylene diisocyanate or 3-isocyanatomethyl-3,5,5-trimethyl cyclohexyl isocyanate,
(c) 1,4-butane diol or 1,6-hexane diol, and
(d) $\beta$-hydroxyethyl (meth)acrylate, $\beta$-hydroxypropyl (meth) acrylate, allyl alcohol, methanol, ethanol or n-butanol.

10. A process for the production of a two-phase bead polymer as claimed in claim 1, which comprises polymerising a solution of
(A$_1$) 88 to 110 parts by weight of at least one methacrylic acid ester containing from 1 to 10 carbon atoms in the aliphatic, saturated alcohol component, up to 40 parts, by weight of the methacrylic acid ester being replaceable by at least one monomer selected from acrylic acid esters containing from 1 to 10 carbon atoms in the aliphatic, saturated alcohol component, hydroxyalkyl esters of methacrylic acid containing from 2 to 4 carbon atoms in the alkyl group, styrene, vinyl acetate, (meth)acrylamide, (meth)acrylic acid and itaconic acid, and
(B$_1$) 0.5 to 12 parts by weight of a linear polyurethane having a molecular weight (number average $\overline{M}_n$) of from $10^4$ to $10^5$ in aqueous medium, from 1 to 6 parts by weight of the aqueous medium being present per part by weight of the solution of (A$_1$) and (B$_1$) under the conditions of a bead polymerisation reaction in the presence of from 0.5 to 2.5% by weight, based on the polymerisable compounds, of at least one monomer-soluble radical former, and of from 0.5 to 100% by weight, based on the polymerisable compounds, of a dispersant at a temperature of from 20° to 120° C., in the absence of applied pressure or under a pressure of up to 10 bars, and optionally in the presence of from 0.001 to 2% by weight, based on the polymerisable compounds of an anionic emulsifier.

11. A process as claimed in claim 10, wherein a water-insoluble salt of an alkaline earth metal is used as the dispersant.

12. A process as claimed in claim 10, wherein MgCO$_3$ is used as the dispersant.

13. A process as claimed in claim 10, wherein polymethacrylic acid is used as the dispersant.

14. A process as claimed in claim 10, wherein polyvinyl alchol is used as the dispersant.

15. A process as claimed in claim 10, wherein polyvinyl pyrrolidone is used as the dispersant.

16. A process as claimed in claim 10, wherein one or more diacyl peroxides are used as the radical former.

17. A process as claimed in claim 10, wherein a mixture of at least one diacyl peroxide and at least one alkylacyl peroxide is used as the radical former.

* * * * *